United States Patent
Mizobuchi et al.

(10) Patent No.: US 9,866,440 B2
(45) Date of Patent: Jan. 9, 2018

(54) RECORDING MEDIUM, HANDLING METHOD GENERATION METHOD, AND INFORMATION PROCESSING APPARATUS

(71) Applicant: FUJITSU LIMITED, Kawasaki-shi, Kanagawa (JP)

(72) Inventors: Yuji Mizobuchi, Kawasaki (JP); Yasuhide Matsumoto, Kawasaki (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 265 days.

(21) Appl. No.: 14/741,912

(22) Filed: Jun. 17, 2015

(65) Prior Publication Data

US 2015/0288568 A1    Oct. 8, 2015

Related U.S. Application Data

(63) Continuation of application No. PCT/JP2012/084222, filed on Dec. 28, 2012.

(51) Int. Cl.
*G06F 15/177* (2006.01)
*H04L 12/24* (2006.01)
*G06F 11/07* (2006.01)

(52) U.S. Cl.
CPC ...... *H04L 41/0859* (2013.01); *G06F 11/0706* (2013.01); *G06F 11/0793* (2013.01); *H04L 41/0886* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 2005/0066239 A1* | 3/2005 | Keeton | G06F 11/008 714/47.1 |
| 2005/0234887 A1* | 10/2005 | Harako | G06F 8/36 |
| 2006/0256714 A1* | 11/2006 | Takagi | H04L 69/40 370/224 |

(Continued)

FOREIGN PATENT DOCUMENTS

| | | |
|---|---|---|
| JP | 8-314751 | 11/1996 |
| JP | 2006-53728 | 2/2006 |

(Continued)

OTHER PUBLICATIONS

Extended European Search Report dated Dec. 3, 2015 in corresponding European Patent Application No. 12890969.4.

(Continued)

*Primary Examiner* — Mohamed Ibrahim
(74) *Attorney, Agent, or Firm* — Staas & Halsey LLP

(57) ABSTRACT

A non-transitory recording medium storing a computer-readable handling-method generation program causing a computer to execute a method including extracting at least one existing system, which has a predetermined similarity with a new system which is newly generated or whose configuration has been changed, based on the similarity between a system configuration of at least one existing system and a system configuration of the new system; and generating candidates of event handling methods corresponding to the new system by using handling methods corresponding to a predetermined event which corresponds to the extracted existing system.

6 Claims, 11 Drawing Sheets

(56) References Cited

U.S. PATENT DOCUMENTS

| | | |
|---|---|---|
| 2008/0059120 A1 | 3/2008 | Xiao et al. |
| 2010/0070462 A1 | 3/2010 | Wada et al. |
| 2011/0016355 A1 | 1/2011 | Watanabe et al. |
| 2011/0208679 A1* | 8/2011 | Watanabe ........... G06F 11/0751 706/12 |

FOREIGN PATENT DOCUMENTS

| | | |
|---|---|---|
| JP | 2010-72834 | 4/2010 |
| WO | 2007/087136 A2 | 8/2007 |
| WO | WO 2009/122525 | 10/2009 |

OTHER PUBLICATIONS

International Search Report dated Mar. 12, 2013 in corresponding International Patent Application No. PCT/JP2012/084222.
Written Opinion of the International Searching Authority dated Mar. 12, 2013 in Corresponding International Application No. PCT/JP2012/084222.
Oono et al., "Service-oriented policy refinement method on autonomous system management", The Institute of Electronics, Information and Communication Engineers Technical Report, Jul. 29, 2005, vol. 105, No. 227, pp. 13-18.
Patent Abstracts of Japan, Publication No. 2010-72834, published Apr. 2, 2010.
Patent Abstracts of Japan, Publication No. 8-314751, published Nov. 29, 1996.
Patent Abstracts of Japan, Publication No. 2006-53728, published Feb. 23, 2006.

* cited by examiner

| TENANT ID | SYSTEM GENERATION DATE AND TIME | SYSTEM CONFIGURATION | | | | | | ACCESS PATTERN (AVERAGE NUMBER OF REQUESTS) | | | ACCESS PATTERN (VARIANCE OF NUMBER OF REQUESTS) | | |
|---|---|---|---|---|---|---|---|---|---|---|---|---|---|
| | | LB | AP1 | AP2 | AP3 | DB | Cache | SMALL 0~149 | MIDDLE 150~300 | LARGE 301~ | SMALL | MIDDLE | LARGE |
| TENANT 1 | 2010/10/01 | 1 | 1 | 0 | 0 | 1 | 0 | 0 | 1 | 0 | 0 | 1 | 0 |
| TENANT 2 | 2010/12/01 | 1 | 1 | 1 | 0 | 1 | 0 | 0 | 0 | 1 | 0 | 0 | 1 |
| TENANT 3 | 2011/02/01 | 1 | 1 | 1 | 0 | 1 | 1 | 0 | 0 | 1 | 0 | 0 | 1 |
| TENANT 4 | 2011/04/01 | 1 | 1 | 0 | 1 | 1 | 1 | 0 | 1 | 0 | 0 | 1 | 0 |
| TENANT 5 | 2011/06/01 | 1 | 1 | 1 | 1 | 1 | 1 | 0 | 1 | 0 | 0 | 1 | 0 |
| TENANT 6 | 2011/08/01 | 1 | 1 | 1 | 1 | 1 | 1 | 0 | 1 | 0 | 0 | 1 | 0 |
| NEW TENANT | 2012/02/01 | 1 | 1 | 1 | 0 | 1 | 1 | 1 | 0 | 0 | 0 | 1 | 0 |

FIG.10

| TENANT ID | HANDLING RECORD | EXECUTED HANDLING | HANDLING DATE | HANDLING RESULT |
|---|---|---|---|---|
| TENANT 1 | Tenant1_Record1 | OP1 | 2011/10/01 | × |
| | Tenant1_Record2 | OP2 | 2011/11/01 | ○ |
| | Tenant1_Record3 | OP3 | 2011/12/01 | ○ |
| TENANT 2 | Tenant2_Record1 | OP1 | 2011/10/01 | ○ |
| | Tenant2_Record2 | OP2 | 2011/11/01 | × |
| TENANT 3 | Tenant3_Record1 | OP1 | 2011/10/01 | ○ |
| | Tenant3_Record2 | OP2 | 2011/11/01 | ○ |
| TENANT 4 | Tenant4_Record1 | OP1 | 2011/10/01 | × |
| | Tenant4_Record2 | OP2 | 2011/11/01 | ○ |
| TENANT 5 | Tenant5_Record1 | OP1 | 2011/10/01 | ○ |
| ... | ... | ... | ... | ... |

FIG.11

| TENANT ID | HANDLING RECORD | EXECUTED HANDLING | HANDLING DATE | HANDLING RESULT |
|---|---|---|---|---|
| TENANT 1 | Tenant1_Record1 | OP1 | 2011/10/01 | × |
|  | Tenant1_Record2 | OP2 | 2011/11/01 | ○ |
|  | Tenant1_Record3 | OP3 | 2011/12/01 | ○ |
| TENANT 2 | Tenant2_Record1 | OP1 | 2011/10/01 | ○ |
|  | Tenant2_Record2 | OP2 | 2011/11/01 | × |
| TENANT 3 | Tenant3_Record1 | OP1 | 2011/10/01 | ○ |
|  | Tenant3_Record2 | OP2 | 2011/11/01 | ○ |
| TENANT 4 | Tenant4_Record1 | OP1 | 2011/10/01 | × |
|  | Tenant4_Record2 | OP2 | 2011/11/01 | ○ |
| TENANT 5 | Tenant5_Record1 | OP1 | 2011/10/01 | ○ |
| ... | ... | ... | ... | ... |

EVALUATION VALUE OF TIMING WHEN $t_0=14$ AND $t=10$ $$Timing(t) = \left(\frac{t}{t_0} - \frac{1}{2}\right)^2 \ (0 \leq t \leq t_0) = \left(\frac{10}{14} - \frac{1}{2}\right)^2 = \left(\frac{3}{14}\right)^2$$

| TENANT ID | SYSTEM GENERATION DATE AND TIME | SYSTEM CONFIGURATION ||||||| ACCESS PATTERN (AVERAGE NUMBER OF REQUESTS) ||| ACCESS PATTERN (VARIANCE OF NUMBER OF REQUESTS) |||
|---|---|---|---|---|---|---|---|---|---|---|---|---|---|---|
|  |  | LB | AP1 | AP2 | AP3 | DB | Cache | SMALL 0~149 | MIDDLE 150~300 | LARGE 301~ | SMALL | MIDDLE | LARGE |
| TENANT 1 | 2010/10/01 | 1 | 1 | 0 | 0 | 1 | 0 | 0 | 1 | 0 | 0 | 1 | 0 |
| TENANT 2 | 2010/12/01 | 1 | 1 | 1 | 0 | 1 | 0 | 0 | 0 | 1 | 0 | 1 | 1 |
| TENANT 3 | 2011/02/01 | 1 | 1 | 1 | 0 | 1 | 1 | 0 | 1 | 1 | 0 | 0 | 1 |
| TENANT 4 | 2011/04/01 | 1 | 1 | 0 | 0 | 1 | 1 | 0 | 1 | 0 | 0 | 1 | 0 |
| TENANT 5 | 2011/06/01 | 1 | 1 | 1 | 1 | 1 | 1 | 0 | 1 | 0 | 0 | 1 | 0 |
| TENANT 6 | 2011/08/01 | 1 | 1 | 1 | 1 | 1 | 1 | 0 | 1 | 0 | 0 | 1 | 0 |
| NEW TENANT | 2012/02/01 | 1 | 1 | 1 | 0 | 1 | 1 | 1 | 0 | 0 | 0 | 1 | 0 |

RECORDING MEDIUM, HANDLING METHOD GENERATION METHOD, AND INFORMATION PROCESSING APPARATUS

CROSS-REFERENCE TO RELATED APPLICATION

This application is a continuation application of International Application PCT/JP2012/084222 filed Dec. 28, 2012 and designating the U.S., the entire contents of which are incorporated herein by reference.

FIELD

The embodiments discussed herein are related to a recording medium, a handling method generation method, and an information processing apparatus.

BACKGROUND

In a related technology, Cloud computing is known in which machine resources can be obtained on an as needed basis. The Cloud computing is expected to be more and more used among various users because cost can be reduced due to sharing of resources among multiple users.

Further, when the Cloud computing will be mainly used, the Cloud computing will be widely used in a manner such that operations are performed on a tenant (e.g., a system that is provided for each of Cloud users) basis due to automatic operation in Cloud. To perform the automatic operation in the Cloud, various handling methods are generated in advance, and the automatic operation is performed using one of the generated handling methods. Here, the "handling method" refers to, for example, various rules, which are used to perform the automatic operation, describing how to handle in respect to various failures and problematic items (events).

As an example of the automatic operation using the handling method, there are a method of preparing a handling method which including a set of handling methods which may be desired for the operations, and an operating method using a handling graph. The "operating method using a handling graph" refers to a method in which cause-and-effect relationships related to an event occurred in a system are visualized using the handling graph, and handling is performed on the event which is observed in the actual system by using the handling graph.

The handling graph is generated by, for example, linking the cause-and-effect relationships between the handling history records in the past and the corresponding events by using a predetermined method which includes a method in which a user determines whether the cause-and-effect relationship exists or a method in which determining whether the cause-and-effect relationship exists is based on statistical data. Further, recently, in order to promptly generate a handling method to perform the automatic operation for a tenant which has changed a configuration or has added a new configuration, which may influence a system operating method, there is a known method in which a pair of the cause-and-effect relationships of the handling graph is divided and managed. In a specific handling method, for example, a handling element figure is generated or a handling graph for a new application is generated. The "handling element figure" refers to a figure in which the handling draft graphs of all the applications on the Cloud are divided for each of the sets of the cause-and-effect relationships, and the groups based on the application characteristics having the cause-and-effect relationships as elements (handling graph elements) are managed. Further, the handling graph for a new application acquires a group of the handling graph elements corresponding to the characteristics of the new application, and connects the cause-and-effect relationship.

Further, a method is known in which in an information system, the handling cases of the failures occurred in the past are registered as failure handling knowledge, so that when a failure occurs, a handling method is recommended based on a symptom of the failure using the acquired failure handling knowledge. Further, a method is known in which job execution cases in the past are classified and stored as know-how in the order corresponding to the job procedure, so as to assist based on the job execution cases in the past in which failure control measures when a failure occurs are stored in order to effectively execute a new job (see, for example, Japanese Laid-open Patent Publication Nos. 2010-72834 and H8-314751).

SUMMARY

According to an aspect of the present application, a non-transitory recording medium storing a computer-readable handling-method generation program causing a computer to execute a method includes: extracting at least one existing system, which has a predetermined similarity with a new system which is newly generated or whose configuration has been changed, based on the similarity between a system configuration of at least one existing system and a system configuration of the new system; and generating candidates of event handling methods corresponding to the new system by using handling methods corresponding to a predetermined event which corresponds to the extracted existing system.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 10 is a drawing illustrating a specific example of a handling history database (DB); and FIG. 11 is a drawing illustrating how timing is evaluated.

DESCRIPTION OF EMBODIMENT

In related technologies in the technical field of handling method generation, all the handling methods with respect to the failures and problematic items (events) occurred in the past are included in the handling methods. Therefore, an unnecessary handling method may also be included, and as a result, it may take time to select an appropriate handling method.

In the following, embodiments of the present invention are described with reference to the accompanying drawings. Note that in the following descriptions, an example is described in which a handling method with respect to a failure and problematic item (event) occurs in operations in a newly-generated system and a new system whose configuration has been changed.

Example of Operation Handling Method Generation System

Figure 1:
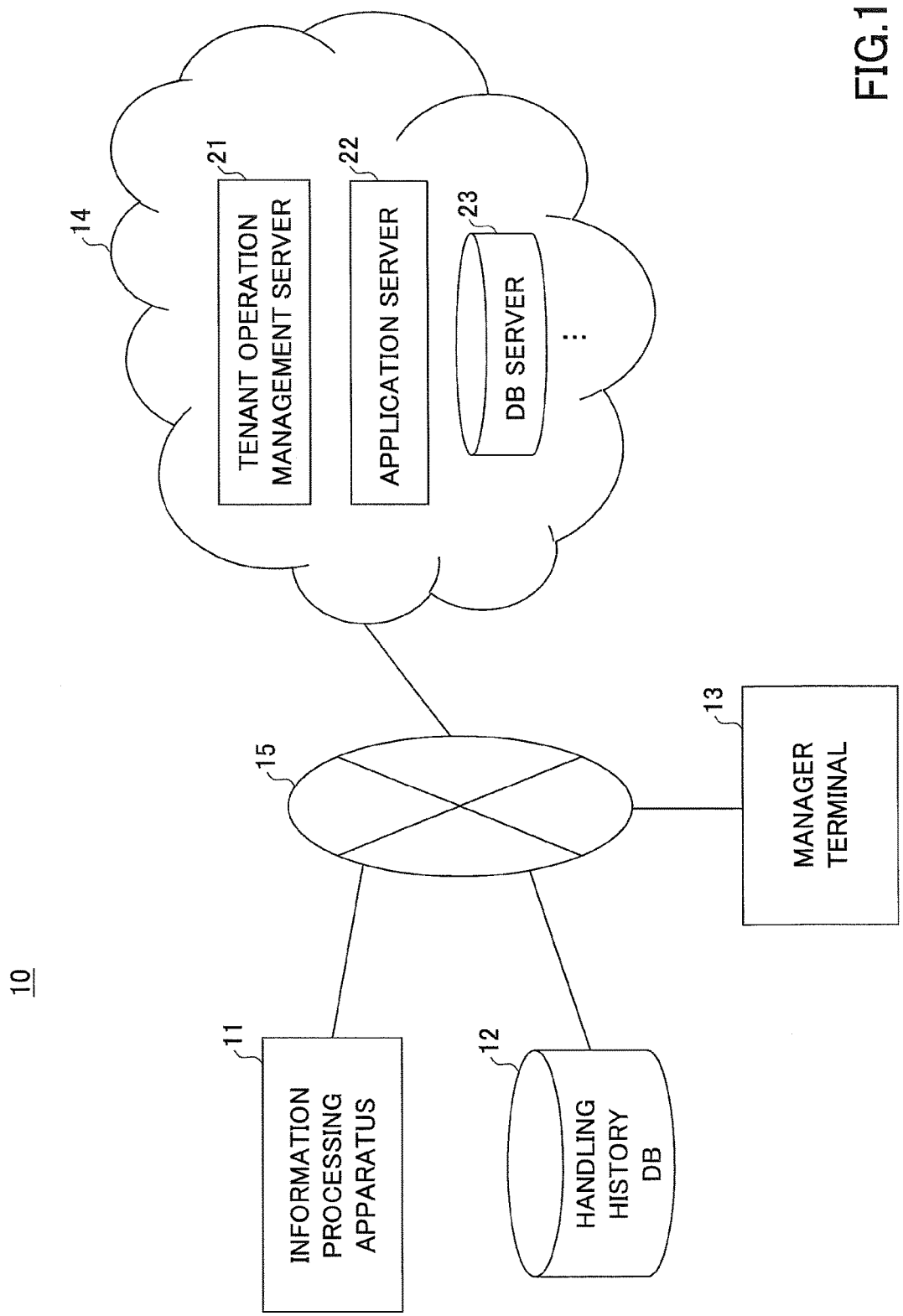
FIG. 1 is a drawing illustrating an example of an operation handling method generation system according to an embodiment.

FIG. 1 illustrates an example of an operation handling method generation system according to an embodiment. An operation handling method generation system 10 of FIG. 1 includes an information processing apparatus 11, a handling history database (DB) 12, a manager terminal 13, and a Cloud system 14. Further, the information processing apparatus 11, the handling history DB 12, the manager terminal 13, and the Cloud system 14 are connected to each other in a data-communicative manner via a communication network 15 such as the Internet.

The information processing apparatus 11 promptly generates an appropriate handling method with respect to a new tenant (new system) whose configuration is newly generated, changed, etc., which influences a system operation method, so as to cause the new tenant to automatically operate by using the generated handling method. Here, the "tenant" refers to, for example, an operation form (e.g., tenant (shop) information (including at least one of a type of a server, the number of the servers, allocation information of apparatuses, an access pattern, an application to be used, etc.)) corresponding to each of the users who use the Cloud system 14.

For example, the information processing apparatus 11 extracts at least one existing system having a predetermined similarity with a new system based on the similarity between system configurations of one or more existing systems and a system configuration of the new system which is newly generated or changed. Further, the information processing apparatus 11 generates candidates of event handling methods related to the new system by using the handling method with respect to a specific event corresponding to the extracted new system. The existing system refers to, for example, a system which is realized by Cloud computing included in the Cloud system 14, or another system which is connected via the communication network 15.

The information processing apparatus 11 acquires (calculates) "usefulness" of the handling methods based on history information such as the handling methods (handling records) which has been performed in one or more existing systems in the past. The "usefulness" refers to an index indicating, for example, whether the handling method used in the existing system can be used in the new system.

Further, the information processing apparatus 11 employs the handling method whose usefulness is high (e.g., the usefulness is greater (higher) than or equal to a predetermined threshold value) and that is used in the existing system as the handling method for the new system, and generates the handling method (e.g., a handling graph, etc.) corresponding to the new system. By evaluating the handling method by using the usefulness, it becomes possible for the information processing apparatus 11 to include effective handling in the handling method without excess and deficiency right after a release of the new system, so that it becomes possible to perform an effective and appropriate operation.

As the information processing apparatus 11, a general-purpose Personal Computer (PC), a server, etc., may be used. However, note that, for example, an information communication terminal such as a tablet terminal, a smartphone, etc., may also be used.

The handling history DB 12 stores handling history information related to the past operations. Further, the handling history DB 12 refers to a set of various information items, and is systematically structured in a manner such that the stored various information items can be searched by using, for example, a keyword so that desired information can be extracted. Further, when a handling method corresponding to the new system is determined, the handling history DB 12 is updated based on the determined information.

The handling history DB 12 may be provided so as to be connected via the communication network 15 as illustrated in FIG. 1, or may be provided in the information processing apparatus 11.

The manager terminal 13 is a terminal which is used by, for example, a manager who manages the whole of the operation handling method generation system 10 or the tenants, etc. For example, the manager terminal 13 transmits the configuration information, etc., of the new system to the information processing apparatus 11, the Cloud system 14, etc., by using a browsing function, a command line, etc., so that the operation handling method corresponding to the new system can be generated. The manager terminal 13 may be, for example, but is not limited to, a PC, a server, an information communication terminal such as a tablet terminal, a smartphone, etc.

The Cloud system 14 refers to, for example, a utility form of a computer based on the Internet included in the communication network 15, and a Cloud environment to realize the Cloud computing. The Cloud system 14 includes, for example, a function as a data center which manages the existing system operated by one or more users. Further, the Cloud system 14 can manage the tenant information for each of the users who use the Cloud system 14. The users can use a computing process for a target operation performed by the Cloud system 14 as a service via the communication network 15.

In FIG. 1, an example is described where the Cloud system 14 includes a tenant operation management server 21, an application server 22, a DB server 23, etc. However, note that the present invention is not limited to this configuration. For example, the number and the types of the servers may differ from those as illustrated in FIG. 1.

The tenant operation management server 21 manages, for example, an operation form, an operation status, an operation history, etc., of the existing system for each of the users who use the Cloud system 14 (tenant information). Further, when receiving a deploy request to deploy a new system from the manager terminal 13, etc., the tenant operation management server 21 can determine the configuration of the new system, etc.

In accordance with a request for a service, a system, etc., received from the information processing apparatus 11, the manager terminal 13, etc., the application server 22 performs a corresponding process by using a predetermined application (e.g., a web application). The DB server 23 stores various data such as an execution history executed on the Cloud system 14, input data, a process execution result, etc.

The Cloud system 14 can receive a service request from the information processing apparatus 11, the manager terminal 13, etc., and perform a predetermined process (job, operation), etc., corresponding to the received request content.

For example, in this embodiment, a tenant manager who wishes to deploy a new system in the Cloud system 14 sends a deploy request to deploy the new system from the manager terminal 13. The request content is received by the tenant operation management server 21, and a generation request to generate a handling method for the new system is transmitted from the tenant operation management server 21 to the information processing apparatus 11. Further, the deploy request may be directly transmitted from the manager terminal 13 to the information processing apparatus 11.

The information processing apparatus 11 extracts a tenant to be sampled from among the existing tenants deployed in the Cloud system 14, groups the handling histories, which are aggregated from the extracted tenant, on a handling method basis, and calculates the usefulness based on the handling type. Further, the information processing apparatus 11 generates the handling method to be employed in the new system based on the calculated usefulness. By doing this, the generated handling method is used in the later operations of the new system.

Example of Functional Configuration of the Information Processing Apparatus 11

Figure 2:
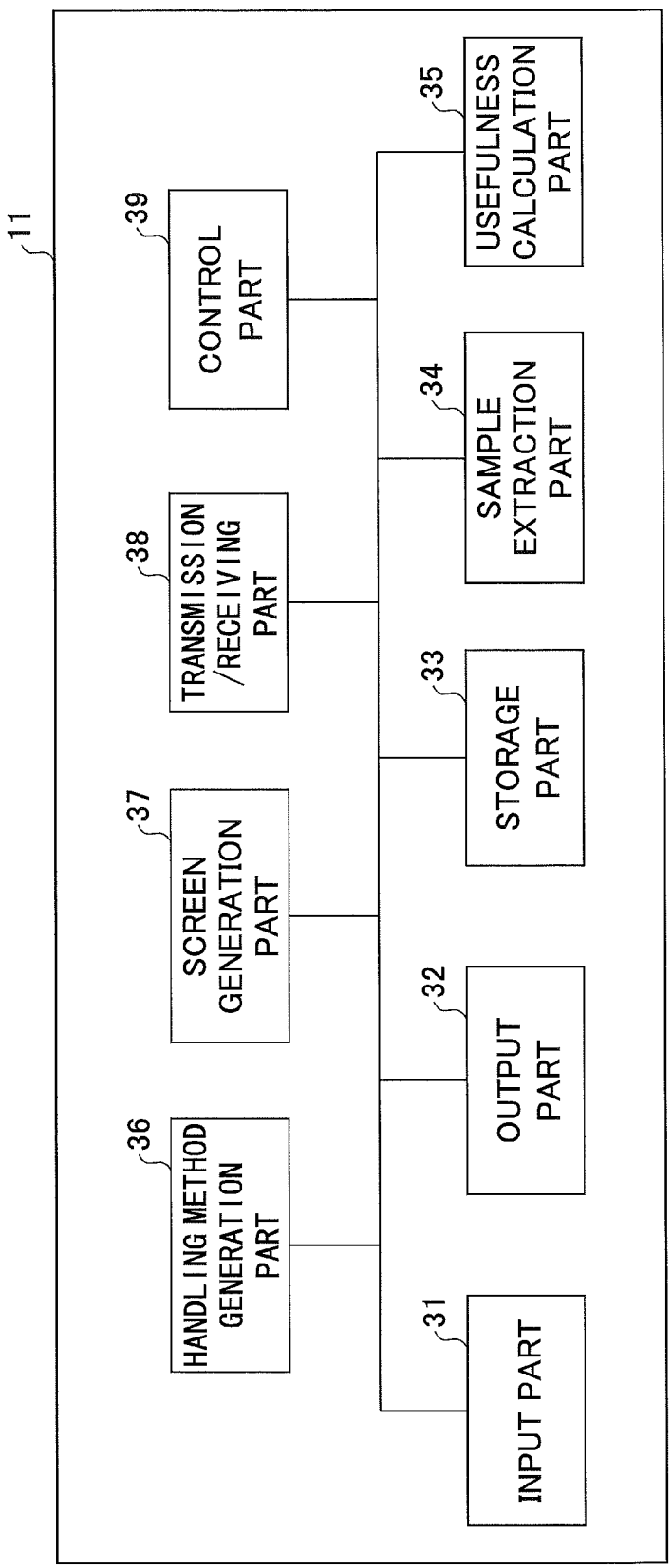
FIG. 2 is a drawing illustrating an example functional configuration of an information processing apparatus.

Next, an example of the functional configuration of the information processing apparatus 11 is described with reference to FIG. 2. FIG. 2 illustrates an example of the functional configuration of the information processing apparatus 11. The information processing apparatus 11 of FIG. 2 includes an input part 31, an output part 32, a storage part 33, a sample extraction part (extraction part) 34, a Usefulness calculation part 35, a handling method generation part 36, an screen generation part 37, a transmission/receiving part 38, and a control part 39.

The input part 31 receives, for example, an input of various instructions related to an operation handling method generation process from, for example, a user who uses the information processing apparatus 11, and an input of setting information. The input part 31 may be, for example, a keyboard and a mouse. Further, the input part 31 may input voice sound, etc. In this case, the input part 31 may include a voice sound input part such as a microphone, etc.

The output part 32 performs output of the content which is input by the input part 31, the content which is executed based on the input content, etc. The output part 32 may include a display part such as a display, etc., when, for example, a screen display is to be displayed as output, and may include a voice sound output part such as a speaker, etc., when voice sound is output.

The storage part 33 stores various information items which are desired in this embodiment. The storage part 33 can store various setting information, etc., to carry out this embodiment. Further, the storage part 33 can read the stored various information items at a predetermined timing on an as-needed basis and read an execution result related to the operation handling method generation process.

The storage part 33 may include a function as a database having a systematic configuration, so that the information corresponding to a keyword can be extracted from the stored information by searching the stored information using the keyword. In this case, the storage part 33 may include the handling history DB 12 described above.

The sample extraction part 34 extracts system configuration information related to all the tenants or a predetermined number of the tenants which have been selected from among the existing tenants, which are managed on the Cloud system 14, based on a predetermined condition.

For example, the predetermined condition may refer to a condition that selects at least one tenant having a predetermined similarity between the system configurations of all the tenants managed on the Cloud system 14 and the new system (new tenant). In this case, one or more tenants having higher similarity with the new system are selected. Further, for example, the predetermined condition may refer to a condition that randomly selects a predetermined number of tenants from all the tenants managed on the Cloud system 14. Further, for example, the predetermined condition may refer to a condition that selects a tenant which has been added or the configuration thereof has been changed within a predetermined time period.

The system configuration information refers to, for example, but is not limited to, at least one of the information items including the type or the number of the servers, allocation information of apparatuses, an access pattern, an application to be used, etc., with respect to the tenant (shop). The sample extraction part 34 generates a list of the handling method executed in the past and extracts, for example, the handling history stored in the handling history DB 12 on an extracted tenant basis.

The Usefulness calculation part 35 calculates the usefulness of the handling methods based on the system configuration information extracted by the sample extraction part 34 and the handling history. Further, the Usefulness calculation part 35 evaluates the handling methods based on the calculated usefulness, and determines the handling method to be employed in the new system. The usefulness may be calculated by using, for example, but not limited to, a predetermined evaluation function.

The handling method generation part 36 generates the handling method for the new system based on the handling method which has been determined as the handling method to be employed in the new system. For example, the handling method generation part 36 links a pair of the cause-and-effect relationships of the event based on a predetermined condition by using the information of the handling method acquired by the Usefulness calculation part 35. Further, the handling method generation part 36 links between the cause-and-effect relationship and the handling, and generates candidates of the handling graph with respect to the events such as a failure which occurs in the operations of a target system, etc. Further, note that the content, which is generated by the handling method generation part 36, is not limited to the handling graph.

The screen generation part 37 generates a development environment (editor) screen to generate the operation handling method in this embodiment, an input screen to input various setting information, etc., and a screen to display the content, etc., after the operation handling method is generated. The screens generated by the screen generation part 37 are displayed on the display of the output part 32.

The transmission/receiving part 38 refers to a communication interface that can transmit and receive, for example, the information which is desired for the processes executed in this embodiment and an execution program to execute an appropriate handling method generation process corresponding to the operations, etc. The transmission/receiving part 38 can send a service request to the Cloud system 14 and receives various information items from the Cloud system 14 via the communication network 15. Further, the transmission/receiving part 38 can transmit and receive various information items to and from the handling history DB 12, the manager terminal 13, an external apparatus, etc.

The control part 39 performs control on all the elements of the information processing apparatus 11. For example, the control part 39 performs control on at least one of the processes including the sample extraction and the handling usefulness determination, the handling method generation, the screen generation, the transmission and receiving, etc.

Further, the information processing apparatus 11 may be separated into plural apparatuses each having at least one of the functions described above. In this case, for example, the information processing apparatus 11 is separated into apparatuses which have the respective functions of the sample extraction part 34, the Usefulness calculation part 35, and the handling method generation part 36. However, note that the configuration is not limited to this configuration.

Information Processing Apparatus 11: Example Hardware Configuration

Figure 3:
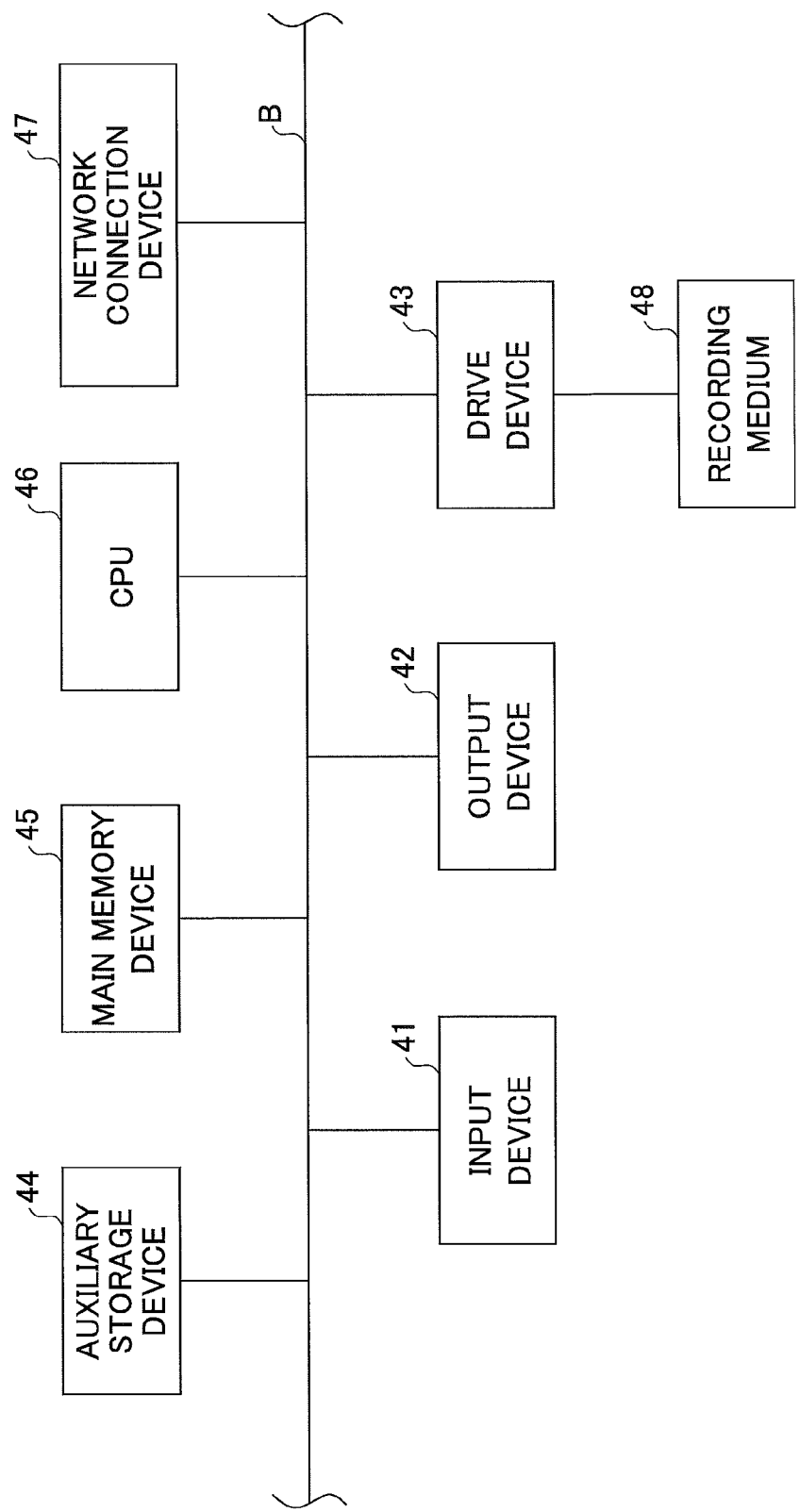
FIG. 3 is a drawing illustrating an example hardware configuration of the information processing apparatus.

Next, an example hardware configuration of the information processing apparatus 11 is described with reference to FIG. 3. FIG. 3 illustrates an example hardware configuration of the information processing apparatus 11. According to the hardware configuration of FIG. 3, the information processing apparatus 11 includes an input device 41, an output device 42, a drive device 43, an auxiliary storage device 44, a main memory device 45, a Central Processing Unit (CPU) 46 which performs various controls, and a network connection device 47, which are connected to each other via a system bus B.

For example, the input device 41 includes a keyboard and a pointing device such as a mouse operated by a user of the information processing apparatus 11, and inputs various instruction signals including the execution of a program from a user.

For example, the output device 42 includes a display to display various windows and data which are desired to operate the computer main body that performs the processes in this embodiment, and displays an execution process and a result of the control program executed by the CPU 46.

Here, the execution program (handling method generation program) installed in the computer main body of the information processing apparatus 11 is provided by, for example, a recording medium 48. The drive device 43 reads various data such as the execution program stored in the recording medium 48. That is, the recording medium 48 can be set in the drive device 43, so that the execution program stored in the recording medium 48 is installed from the recording medium 48 into the auxiliary storage device 44 via the drive device 43. When the recording medium 48, which is set in the drive device 43, is writable, the drive device 43 can also write the data such as an execution result acquired by, for example, executing the execution program.

The auxiliary storage device 44 is a storage part such as a hard disk drive, a Solid State Drive (SSD), etc., and stores the execution program, the control program, etc., and performs input/output of the programs on an as-needed basis.

The main memory device 45 stores the execution program which is read from the auxiliary storage device 44 by the CPU 46. The main memory device 45 may be, for example, but is not limited to, a Read-Only Memory (ROM) and a Random Access Memory (RAM), etc.

The CPU 46 performs control on the entire process of the computer such as various calculations, data input/output between various hardware elements, etc., based on the control program of an Operation System (OS), etc., and the execution program stored in the main memory device 45. By doing this, in this embodiment, the processes in the handling method generation are realized. Further, necessary information, etc., during the program execution is acquired from the auxiliary storage device 44, etc., by the CPU 46. Further, the execution result, etc. is stored in the auxiliary storage device 44, etc., by the CPU 46.

The network connection device 47 is a communication interface which enables transmitting and receiving data to and from the handling history DB 12, the manager terminal 13, the Cloud system 14, an external apparatus, etc., via the communication network 15. By the network connection device 47, it becomes possible to acquire the execution program and various data and provide the execution result acquired by executing the program or the execution program itself to an external apparatus, etc.

The recording medium 48 stores the execution program so as to be read by the computer as described above. For example, the recording medium 48 may be a portable recording medium such as a Universal Serial Bus (USB) Memory, a CD-ROM, a DVD disk, etc., or may be a semiconductor memory such as a flash memory, etc. Further, the hardware configuration of FIG. 3 may also be applied to a hardware configuration of the manager terminal 13.

Example of Operation Handling Method Generation Process

Figure 4:
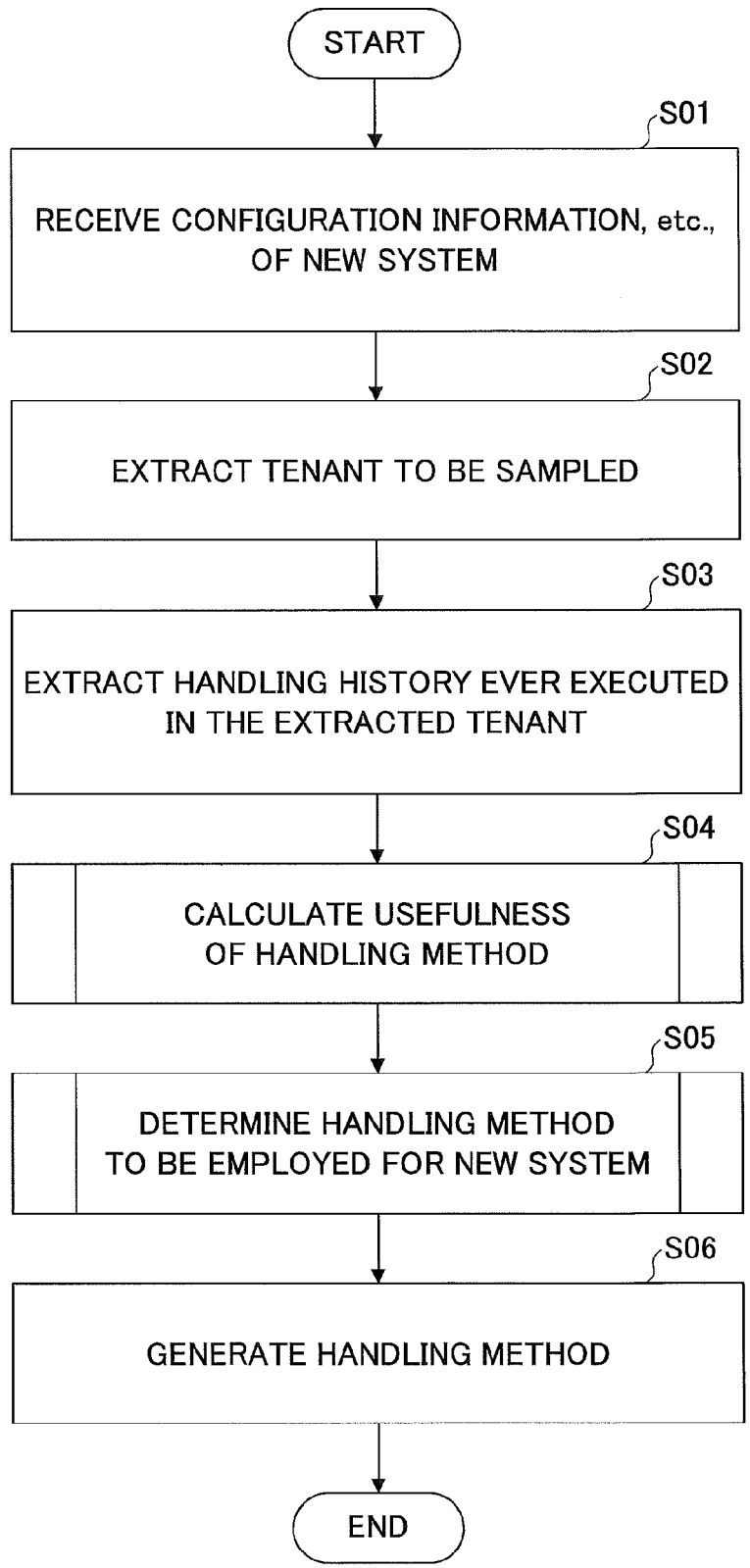
FIG. 4 is a flowchart of an example of an operation handling method generation process according to an embodiment.

Next, an example of the operation handling method generation process is described with reference to a flowchart of FIG. 4. FIG. 4 is a flowchart of an example of the operation handling method generation process according to this embodiment.

In the example of FIG. 4, the operation handling method generation process receives the configuration information, etc., of the new system, for which the operation handling method is to be generated, by an execution instruction from a user of the information processing apparatus 11, the manager terminal 13, etc., (step S01).

Next, the operation handling method generation process extracts the tenant to be sampled (step S02). For example, the extracted tenant may be all the tenants or a tenant which satisfies a predetermined condition from among the existing tenants (existing systems) managed on the Cloud system 14. Further, the predetermined condition may refer to a condition that selects a tenant having a similar system configuration as that of the new system or that randomly selects a predetermined number of tenants from among all the tenants managed on the Cloud system 14. Further, the predetermined condition may refer to a condition that selects a tenant that has been added or whose configuration has been changed within a predetermined time period. In step S02, the system configuration information, etc., of the tenant selected as the sample is extracted.

The operation handling method generation process extracts the handling history (handling record), etc., which was executed in the past with respect to the extracted tenants (step S03), and performs a process of calculating the usefulness of the handling methods by using the system configuration information, etc., acquired in step S02 (step S04).

Further, the operation handling method generation process evaluates the handling methods by using the usefulness acquired in step S04, determines the handling method to be employed in the new system (step S05), and generates the handling method, which corresponding to the events such as failures occurred during the operations of the new system, based on the determined result (step S06).

Step S04: Usefulness Calculation Process of Handling Methods

Figure 5:
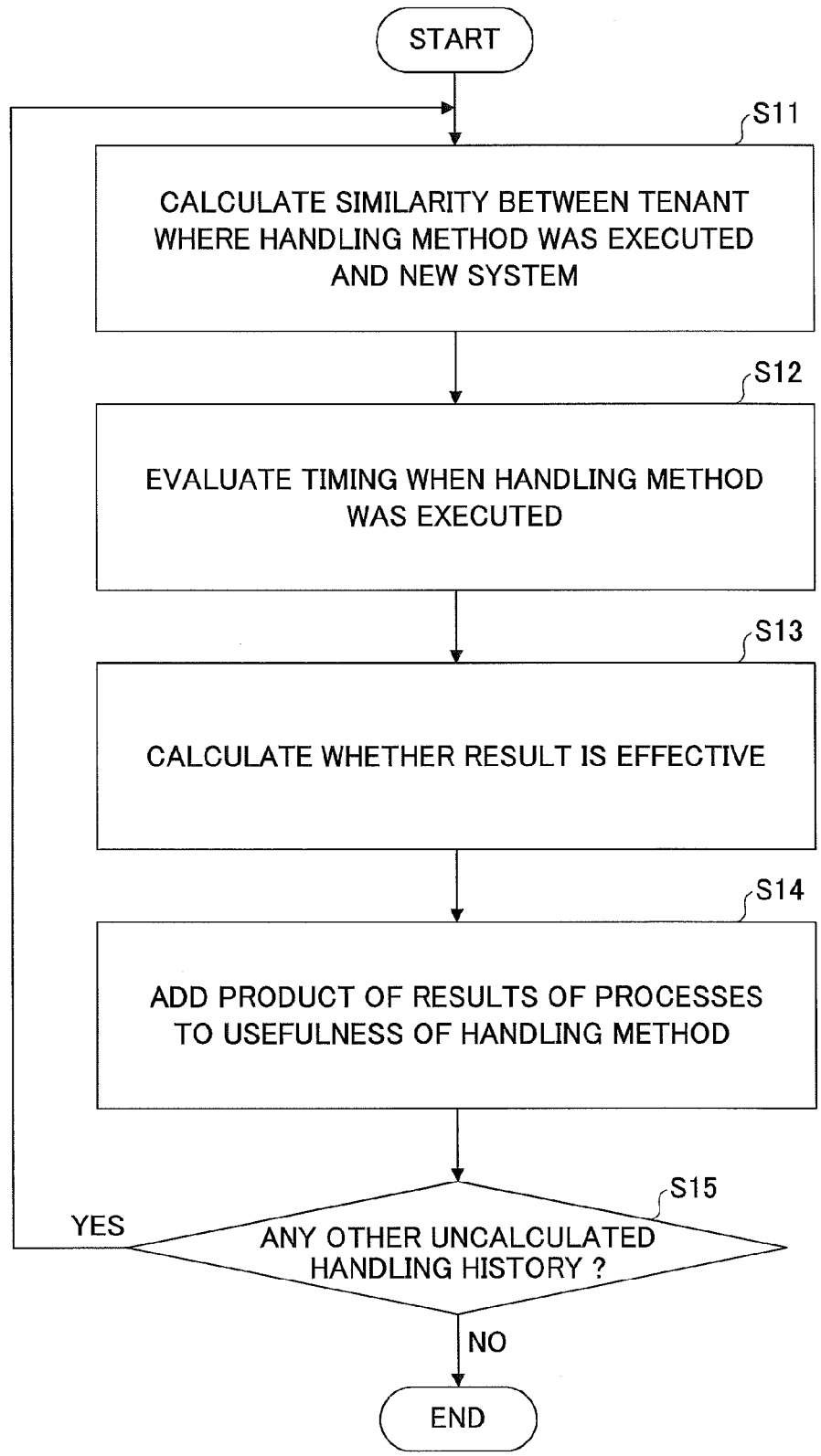
FIG. 5 is a flowchart of an example of a usefulness calculation process of a handling method.

Here, an example process of the usefulness calculation process of the handling method in the above step S04 is described with reference to a flowchart of FIG. 5. FIG. 5 is a flowchart of an example of the usefulness calculation process of the handling method.

In the example of FIG. 5, the usefulness calculation process calculates the similarity between the tenant where the handling method was executed and the new system (step S11). Further, the usefulness calculation process evaluates the timing when the handling method was executed (step S12), and calculates (determines) whether the handling method was effective (step S13).

Further, the usefulness calculation process adds the multiplied results of the processes described above to the usefulness of the calculated handling method (step S14). Here, the usefulness calculation process determines whether there exists an uncalculated handling history (step S15). When determining that there exists an uncalculated handling history (YES in step S15), the process goes back to step S11, so that a similar process is performed on the other handling history. On the other hand, when determining that there exists no uncalculated handling history (NO in step S15), the process ends.

Step S05: Handling Method Determination Process

Figure 6:
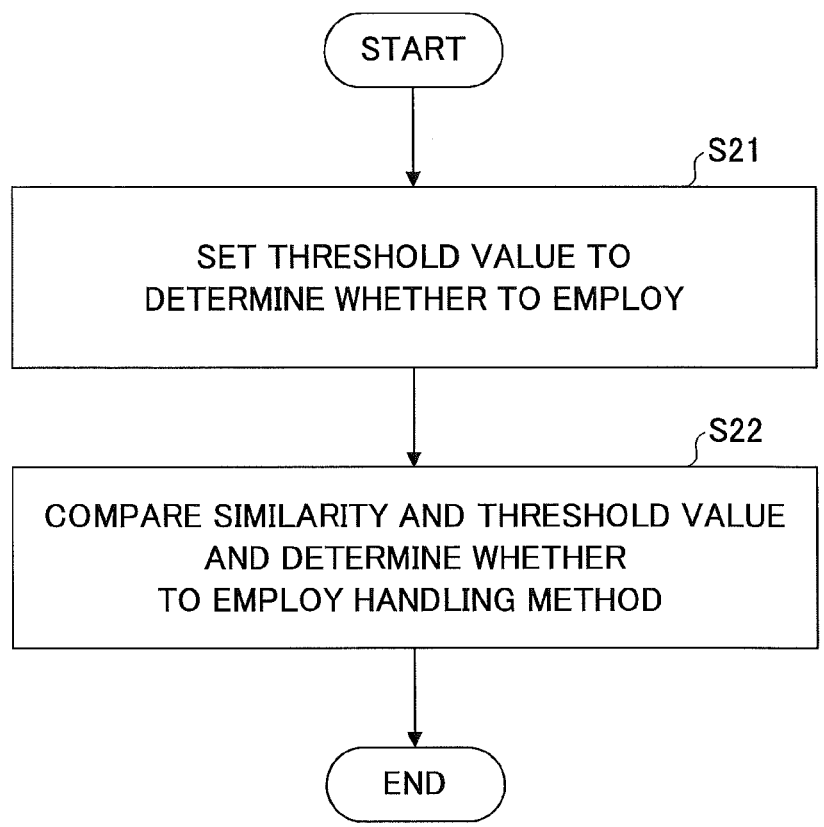
FIG. 6 is a flowchart of an example of a handling process determination process.

Next, an example of the handling method determination process in the above step S05 is described with reference to a flowchart of FIG. 6. FIG. 6 is a flowchart of an example of the handling method determination process. In the example of FIG. 6, the handling method determination process sets a threshold value to determine whether to employ the process in the new system (step S21).

Here, for example, the threshold value may be a value which is set by a manager, etc., or may be an average value of all the usefulness calculated in the usefulness calculation process. However, note that the threshold value is not limited to those values. For example, the threshold value may be a value which is acquired by adding variance of any multiple number to the average value, or may be arbitrarily changed in accordance with the type, the field, or the operation form of the new system.

Further, the handling method determination process determines whether to employ the handling method based on a comparison between the usefulness acquired in the usefulness calculation process and the threshold value set in the process in step S21 (step S22). By step S22, for example, one or more candidates of the handling methods are generated.

Usefulness

Next, the "usefulness" in the Usefulness calculation part 35 is specifically described.

First, in a conventional method, when a handling method is generated, for example, all the handling methods are included, which are related to the problems (events) occurred in the past. Due to this, in the conventional method, an unnecessary handling method may be included, so that it takes time to select an appropriate handling. For example, in a conventional method, a handling method may be included, which had been used many times, even when there exists a new handling method which is more effective.

Therefore, in this embodiment, for example, it is set in a manner such that the later a handling method has been executed, the more appropriate the handling method is and the higher the "usefulness" is. Here, the handling method which is executed later refers to the handling method which was executed at the timing closest to the timing when the generation of a handling method was instructed or a predetermined number of the handling methods whose execution timings were closer to the timing when the generation of a handling method was instructed than any other handling methods when the handling history DB 12 is referred to.

By doing this, it becomes possible to use the handling method which had been executed lately when a problem occurs. For example, in a case where scale-out, etc., had been done lately in response to a failure (event) of worsening response, it is set so that the usefulness of the handling method becomes higher. Therefore, in this embodiment, it becomes possible to employ a more effective new handling method as the handling method for the new system.

Further, in this embodiment, it is not possible to ignore a problem occurring right after a system release. This is because a failure rate is higher during a certain period right after the system release. Therefore, in this embodiment, it is set so that the later the tenant is released, the higher the usefulness of the handling method executed in the tenant becomes.

Further, in a conventional method, resemblance of the operation form (e.g., the type and the number of the servers, an access pattern, etc.) between a target system and another system is not additionally considered. Therefore, a handling method that cannot be employed due to a difference in the configuration is also included as candidates.

In this embodiment, therefore, it is set so that, for example, the more similar the newly-generated system or the new system whose configuration has been changed is to the existing system, the higher the usefulness of the handling executed in the newly-generated system or the new system becomes. That is, in this embodiment, according to the points described above, for example, the usefulness of the handling which is desired in a new system is acquired by using a predetermined evaluation function, and the handling having a higher usefulness is added to a candidate of the handling method for the new system. Here, an example of the "usefulness" can be expressed by the following evaluation function formula (Formula (1))

$$\text{Usefulness} = \sum_{n=1}^{N} \text{Similarity}(S_0, S_n) * \text{Timing}(t) * \text{Result} \qquad (1)$$

In the example of Formula (1), the usefulness can be calculated by multiplying "Similarity($S_0, S_n$)" which denotes the similarity of tenant when the number of the extracted tenants to be sample targets is "N", "Timing(t)" which is an evaluation formula of the timing when the handling was executed, and "Result" which refers to a result of the handling.

For example, the "Similarity of tenant" refers to the similarity between the new tenant (new system) and the tenant to become a sample. Further, for example, the "evaluation formula of the timing when the handling was executed" refers to a formula to evaluate the usefulness of the handling based on the timing when the handling was executed, and means that the sample to be evaluated "Oi" was executed in the tenant "Cn" at the timing of "t".

Further, for example, the "result of the handling" is evaluated as "1" when a result of the handling was effective and "0" when the result of the handling was not effective. Here, whether effective or not may be set by a user. Further it is possible to determine that the handling method is effective when results are compared between before and after the handling method is executed and a desired effect is acquired. The result of the handling is not limited to "0" and "1". For example, the result of the handling may have weighted values such as "1", "0.5", "0.2", and "0" in accordance with the levels of the effect.

Here, in this embodiment, as an example of a factor which determines the system configuration, there are, for example, but are not limited to, a machine configuration of the system, a software stack (middleware, application) of machines, a use status (an average access amount, the maximum access value, the minimum access value, an access distribution) of the system, changed history of the system configuration and a cyclic access pattern, Service Level Agreement (SLA), etc.

Further, in the calculation of the "Similarity", for example, Cosine-based similarity, Correlation-based similarity, Adjusted cosine-based similarity, etc., may be used. However, for example, any other similarity may also be used.

For example, the "Timing(t)" which is an evaluation formula of the timing may be given as described in the following Formula (2)

$$\text{Timing}(t) = \left(\frac{t}{t_0} - \frac{1}{2}\right)^2 \quad (0 \le t \le t_0) \quad (2)$$

In Formula (2), "t" denotes the handled timing, and "$t_0$" denotes the time period which starts from when the system to be evaluated (specifically, the existing system to be evaluated) has been released.

That is, in Formula (2), the later the handling timing is and the closer the handling timing is to the timing of the system release, the more important the timing is. For example, in Formula (2), the scale of "t" may be any scale such as one month, one day, etc. However, the scale of "t" is not limited to any of those scales.

Further, the value of "$t_0$" has the meaning that the greater the value of "$t_0$" is, the greater the maturity of the system where the handling method was executed becomes. In this embodiment, it is evaluated that the greater the maturity is, the more extremely important the handling executed right after the release and the latest handling become.

On the other hand, in an immature system, there is no such difference in weighting as in a mature system. In this embodiment, the less mature the system is, the higher the evaluation of the handling becomes as a whole. This means that in an immature system which has been released lately, the more recently the system has been released, the more difficult handling executed then is ignored.

Further, in this embodiment, as illustrated in above Formula (1), for example, when an operation method for a new system is newly generated, the usefulness of the handling which was already executed in another system is evaluated based on a product of predetermined evaluation methods.

That is, in one example of the evaluation in this embodiment, the more similar the system at the time when the handling is executed is to the system for which a new operation method is generated, the higher the usefulness is set. Further, as another example of the evaluation, the later the handling is executed and the closer the timing when the handling is executed to the release timing after the release, the higher the usefulness may be set. In the above evaluation method, the usefulness of the handling is evaluated higher when the handling was executed recently and right after the system release in accordance with the operation period of the system where the handling was executed. Further, as still another example of the evaluation, the greater the number of times that the handling was actually executed and the result was evaluated as effective, the greater the usefulness of the handling is set.

As described above, in this embodiment, by evaluating the handling by using the usefulness, it becomes possible to include effective handling in the handling method without excess and deficiency right after a release, so that it becomes possible to generate an appropriate handling method. Further, in this embodiment, it becomes possible to perform effective operations by using the generated handling method.

Specific Example of the Operation Handling Method Generation

Figure 7:
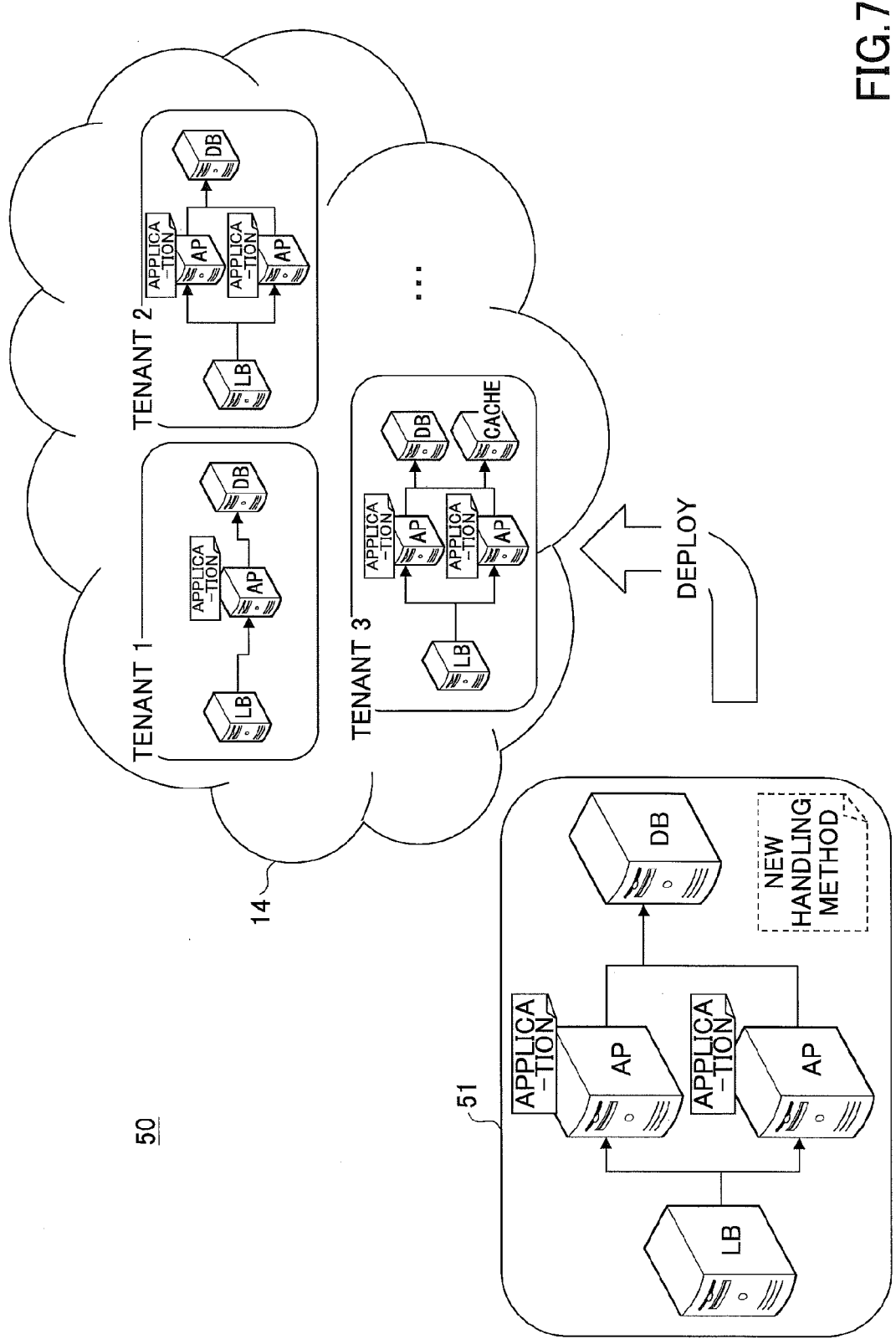
FIG. 7 illustrates a specific example of operation handling method generation.

Next, an specific example of the operation handling method generation according to this embodiment is described. FIG. 7 illustrates a specific example if the operation handling method generation. In the example of FIG. 7, in an operation handling method generation system 50, when the information processing apparatus 11 deploys a new tenant 51 in the Cloud system 14 based on an instruction from the manager terminal 13, an operation handling method is generated.

The new tenant 51 as illustrated in FIG. 7 includes a load balancer ("LD"), two application servers ("AP") which are connected to the LB in parallel, and a DB server ("DB"). Further, in the new tenant 51, the LB, the AP, and the DB constitute respective layers. That is, the new tenant 51 in FIG. 7 indicates an example of a "three-layered Web application without cache".

Here, when the new tenant 51 as illustrated in FIG. 7 is generated, it is desired to have a handling method such as a new corresponding operation. To that end, in this embodiment, a handling method corresponding to the system of the new tenant 51 is generated by referring to the Cloud system 14 as described above. In the example of FIG. 7, apparatus configurations of the tenants 1 through 3 are illustrated. Note that, however, the number of the tenants and the apparatus configurations thereof are not limited to those in FIG. 7. Further, for example, the information related to the tenants is stored in the DB server 23 and managed by the tenant operation management server 21.

System Configuration Information of Tenants

Figures 8A, 8B:
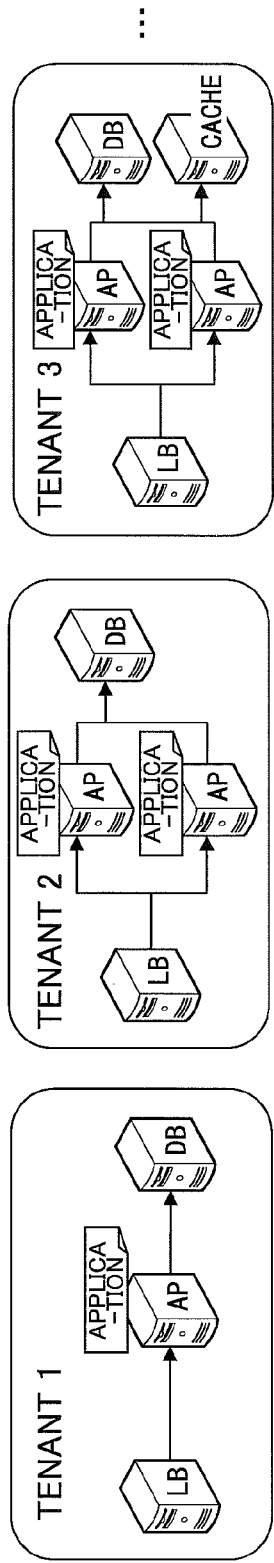
FIGS. 8A and 8B illustrate an example of system configuration information.

Here, an example of the system configuration information managed by the Cloud system 14 is described with reference to FIGS. 8A and 8B. FIG. 8A illustrates an example of the tenants included in the Cloud system 14 of FIG. 7. FIG. 8B illustrates an example of the system configuration information corresponding the tenants included in the Cloud system 14.

For example, FIG. 8A illustrates the system configuration of the existing tenants 1 through 3. In the tenant 1, the LB, the AP, and the DB are connected in series. In tenant 2, a configuration similar to that of new tenant 51 is provided. In tenant 3, a cache server ("Cache") is additional connected to the configuration of the tenant 2. That is, the system configuration of the tenant 3 is a "three-layered Web application with cache".

For example, the items of the system configuration information of FIG. 8B are "tenant ID", "system generation date and time", "system configuration", "access pattern (average number of requests)", "access pattern (variance of the number of requests)", etc. Note that, however, the items of the system configuration information are not limited to those items. In the example of FIG. 8B, the data of the tenants 1 through 6 and the new tenant are stored. Note that, however, the data are not limited to the example of FIG. 8B.

The "tenant ID" indicates the identification information to identify the tenant to be managed in the Cloud system 14. In the example of FIG. 8B, for explanatory purposes, the tenant IC corresponding to the new tenant 51 is indicated as "new tenant".

The "system generation date and time" stores the date and time when the tenant is newly generated. When the existing system configuration is changed and updated, the date and time when changed and updated are also stored in the "system generation date and time". In the example of FIG. 8B, only dates are stored. Note that, however, the time information may be additionally stored.

The "system configuration" stores the types and the number of the apparatuses which are actually used in the tenants. It is assumed that a value "0" is set as the initial value.

For example, in the example of FIG. 8B, in response to the system configuration of FIG. 8A, a value "1" is set in the items "LB", "AP1", and "DB" for tenant 1, the value "1" is set in the items "LB", "AP1", "AP2", and "DB" for tenant 2, and the value "1" is set in the items "LB", "AP1", "AP2", "DB", and "Cache" for tenant 3.

In the example of FIG. 8B, the items "AP1", "AP2", and "AP3" are separately provided as the indication of "AP". Note that, however, the configuration indicating the "AP" is not limited to that described in FIG. 8B. For example, in the case of tenant 2, only one item of "AP" may be provided and a value "2", etc., may be set thereto.

For example, in the "access pattern (average number of requests)", a value "1" is set to the corresponding column (cell) based on the average number of requests acquired based on the numbers of access requests to the tenant in the predetermined time intervals from among the classified columns set in advance based on the calculation results. In the example of FIG. 8B, columns "small 0-149", "middle 150-300", "large 301 or more" are illustrated. Note that, however, the classification and the numbers of the "access pattern (average number of requests)" are not limited to those illustrated in FIG. 8B.

For example, in the "access pattern (variance of the number of requests)", a value "1" is set to the corresponding column (cell) from among the classified columns "small", "middle", and "large" based on the variance value of the number of access requests from users to the tenant in a predetermined period. Note that, however, the classification of the "access pattern (variance of the number of requests)" is not limited to the that in FIG. 8B.

Further, it is not possible for a new system to calculate the access patterns before the actual operations. Therefore, for example, a value "1" is set to the estimated one or more access patterns. Further, for example, the access patterns of the new system may be set by a manager based on a designated SLA, a predetermined policy (e.g., the minimum configuration), etc.

In this embodiment, the characteristics of the system configuration are vectorized by using the above-described system configuration, average number of requests, and variance of the number of the requests, and the usefulness is calculated by using the vectorized value.

Sample Extraction Method

Next, a sample extraction method performed by the sample extraction part 34 is described. In a sample extraction method in this embodiment, for example, when the similarity between the existing systems and the new system using the system configuration information exceeds a predetermined threshold value, the information of the existing system is extracted (extraction method 1).

In addition to the above extraction method 1, in another sample extraction method, for example, when the transition of the configuration change (e.g., how the system configuration was sequentially changed) is similar, it is assumed that the similarity is high, so that the target existing system is extracted (extraction method 2). Note that, however, the extraction method is not limited to those methods.

In this embodiment, for example, the system configuration information of the tenants, which are to be sampled, extracted by the sample extraction part 34 using the above described extraction method and a list of the handling methods executed in the past are generated.

Figure 9:
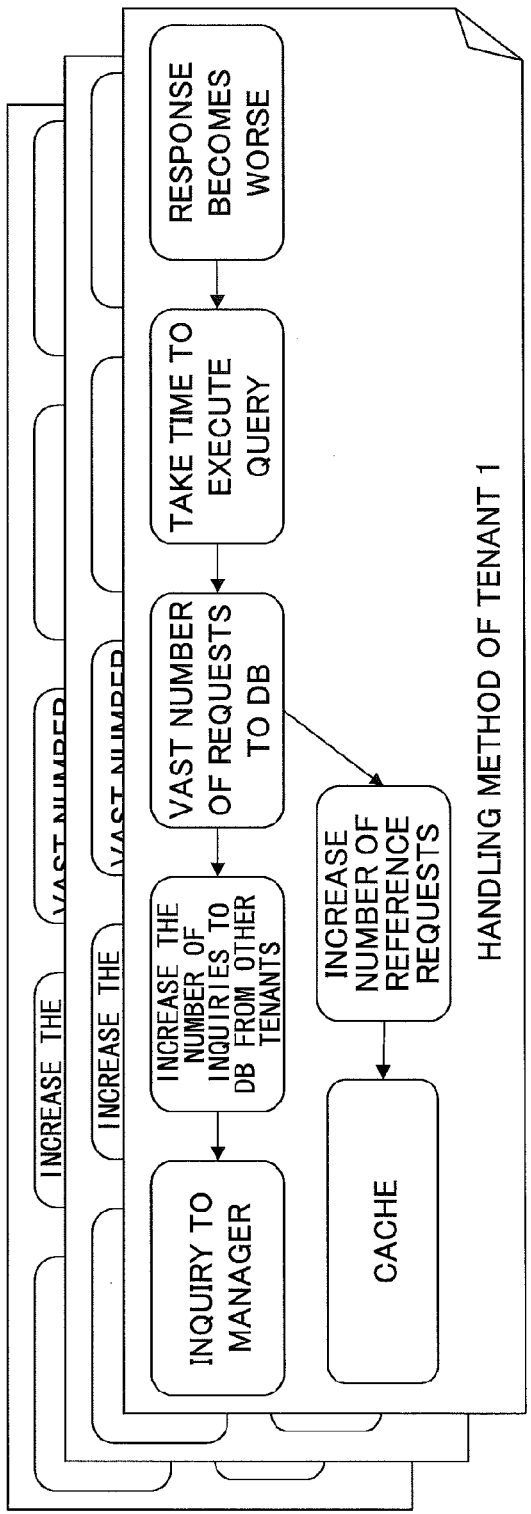
FIG. 9 illustrates an example process of handling method list generation.

FIG. 9 illustrates how the list of the handling methods is generated. Part (A) of FIG. 9 illustrates an example of handling graphs, and part (B) of FIG. 9 illustrates a list of the handling methods corresponding to part (A) of FIG. 9.

For example, the list of the handling methods in part (B) of FIG. 9 includes items "handling ID", "handling content", and one or more "monitoring items", etc. Note that, however, the items are not limited to those items.

For example, the "handling ID" refers to the information to distinguish handling methods one from another. As illustrated in part (A) of FIG. 9, when a plurality of handling methods are included in one handling graph, a plurality of handling IDs are used to manage those handling methods.

For example, in the "handling content", a specific content of the handling is described for each of the handling IDs. In the "monitoring items", the items sequentially monitored in a case of an event occurred during the operations until the handling, which is stored in the "handling content", is executed.

For example, in the example of part (B) of FIG. 9, in the case where the "handling ID" is "OP1", when the "monitoring items" are sequentially changed in the order of "response becomes worse", "take time to execute query", "vast number of requests to DB", and "increase the number of inquiries to DB from other tenants", the "inquiry to manager" as the "handling content" is performed. Further, for example, in the example of part (B) of FIG. 9, in the case where the "handling ID" is "OP2", when the "monitoring items" are sequentially changed in the order of "response becomes worse", "take time to execute query", "vast number of requests to DB", and "increase the number of reference requests", the "Caching" as the "handling content" is performed.

For example, the list of the handling methods as illustrated in part (B) of FIG. 9 is generated by the sample extraction part 34. The list of the handling methods can be stored in the storage part 33 and read on an as-needed basis.

Specific Example of the Handling History DB 12

Next, a specific example of the handling history DB 12 is described with reference to FIG. 10. FIG. 10 illustrates a specific example of the handling history DB 12. The handling history DB 12 of FIG. 10 illustrates the handling histories executed in the past on the tenant basis. For example, the items of the handling history DB 12 include "tenant ID", "handling record", "executed handling", "handling date", and "handling result". Note that, however, the items are not limited to those items.

The "tenant ID" refers to the information to distinguish the tenants existing in the Cloud system 14 one from another. For example, the "handling record" refers to record information which is generated in response to an event such as a failure occurred on a tenant basis.

The "executed handling" stores the handling content executed corresponding to the handling record. For example, when two or more handlings were executed in response to one handling record, those handlings are stored.

The "handling date" stores the date when the handling was executed. For example, the "handling date" may further include time information. The "handling result" stores information to determine whether the handling was effective or not as a result of the handling. In the example of FIG. 10, a mark "o" is set when the "handling result" was effective and a mark "x" is set when the "handling result" was not effective. The information set herein is not limited to those marks. For example, as the values of the "handling result", discriminable information such as "1" and "0", "Yes" and "No", "OK" and "NG", etc., may be used.

In the handling history DB 12 of FIG. 10, in the case where the "tenant ID" is "tenant 1", three "handling records" which are Tenant1_Record 1 through 3, are stored. The "Tenant1_Record 1" indicates that the handling "OP1" was executed on "2011/10/01" but no effective result was obtained ("x" is marked in the "handling result").

Further, the "Tenant1_Record 2" indicates that the handling "OP2" was executed on "2011/11/01" and an effective result was obtained ("o" is marked in the "handling result"). Further, the "Tenant1_Record 3" indicates that the handling "OP3" was executed on "2011/12/01" and an effective result was obtained ("o" is marked in the "handling result").

In this embodiment, the usefulness corresponding to each of the handling methods is calculated by using the information items described above. In the following example, the usefulness of the handling method "OP1" is calculated.

The histories (handling records) where the handling method "OP1" was executed in the handling history DB 12 of FIG. 10 correspond to "Tenant1_Record1", "Tenant2_Record1", "Tenant3_Record1", "Tenant4_Record1", and "Tenant5_Record1". Therefore, in $$\overline{\text{Tenant 2}} = \frac{8}{12} = \frac{2}{3}$$

$$\overline{\text{New tenant}} = \frac{8}{12} = \frac{2}{3}$$

$$\text{Similarity\_Corr}(\text{Tenant 2, New tenant}) = \frac{A}{B \cdot C} = \frac{\frac{23}{9}}{\frac{24}{9}} = \frac{23}{24}$$

$$\text{Where } A = \left(\frac{1}{3}\right)^2 + \left(\frac{1}{3}\right)^2 + \left(\frac{1}{3}\right)^2 + \left(-\frac{2}{3}\right)^2 + \left(\frac{1}{3}\right)^2 + \left(\frac{1}{3}\right)\left(-\frac{2}{3}\right) + \left(\frac{1}{3}\right)\left(-\frac{2}{3}\right) + \left(\frac{1}{3}\right)^2 + \left(\frac{1}{3}\right)\left(-\frac{2}{3}\right) + \left(-\frac{2}{3}\right)^2 + \left(\frac{1}{3}\right)\left(-\frac{2}{3}\right) + \left(\frac{1}{3}\right)\left(-\frac{2}{3}\right)$$

$$B = \sqrt{\left(\frac{1}{3}\right)^2 + \left(\frac{1}{3}\right)^2 + \left(\frac{1}{3}\right)^2 + \left(-\frac{2}{3}\right)^2 + \left(\frac{1}{3}\right)^2 + \left(-\frac{2}{3}\right)^2 + \left(-\frac{2}{3}\right)^2 + \left(\frac{1}{3}\right)^2 + \left(\frac{1}{3}\right)^2 + \left(-\frac{2}{3}\right)^2 + \left(\frac{1}{3}\right)^2 + \left(\frac{1}{3}\right)^2}$$

$$C = \sqrt{\left(\frac{1}{3}\right)^2 + \left(\frac{1}{3}\right)^2 + \left(\frac{1}{3}\right)^2 + \left(-\frac{2}{3}\right)^2 + \left(\frac{1}{3}\right)^2 + \left(\frac{1}{3}\right)^2 + \left(\frac{1}{3}\right)^2 + \left(\frac{1}{3}\right)^2 + \left(-\frac{2}{3}\right)^2 + \left(-\frac{2}{3}\right)^2 + \left(\frac{1}{3}\right)^2 + \left(-\frac{2}{3}\right)^2}$$

(5)

this embodiment, the usefulness is acquired by using the above handling history information and above Formula (1).

Specific Example of Calculating Similarity

First, in this embodiment, the similarity between the existing tenant ("tenant 2" in this case) and the new tenant is acquired. Specifically, the similarity between the tenant 2 and the new tenant is calculated by, for example, assigning the information of the tenant 2, which is included in the system configuration information of FIG. 8B, to the following Formula (3). For example, the similarity may be calculated by using Cosine-based function. Note that, however, the calculation of the similarity is not limited to this.

$$\text{Similarity}(\text{Tenant 2, New tenant}) = \cos \alpha = \frac{\overrightarrow{\text{Tenant 2}} \cdot \overrightarrow{\text{New tenant}}}{|\overrightarrow{\text{Tenant 2}}||\overrightarrow{\text{New tenant}}|} \quad (3)$$

$$= \frac{6}{\sqrt{8}\sqrt{8}} = \frac{3}{4}$$

According to the calculation result using the above Formula (3), the similarity (tenant2, new tenant)=¾, which denotes the similarity between the tenant 2 and the new tenant, is obtained.

Similarity Calculation Based on Correlative Relationship

As another example of similarity calculation, it is possible to calculate the similarity based on a correlative relationship. In this case, for example, it is possible to calculate the similarity between "A" and "B" by using the following Definition Formula (4).

$$\text{Similality\_corr}(A, B) = \frac{\Sigma_i(A_i - \overline{A_i})(B_i - \overline{B_i})}{\sqrt{\Sigma_i(A_i - \overline{A_i})^2}\sqrt{\Sigma_i(B_i - \overline{B_i})^2}} \quad (4)$$

Where, the variable "i" corresponds to, for example, the number of predetermined items illustrated in FIG. 8B.

Therefore, when the similarity between the tenant 2 and the new tenant is calculated by using the above Formula 4, which is the similarity calculation Formula based on the correlative relationship, a result as illustrated in the following Formula (5) is obtained.

For example, in the above Formula (5), in both the tenant 2 and the new tenant, a value "1" is set to eight items among all the twelve items in the "system configuration", "access pattern (average number of requests)", and "access pattern (variance of the number of requests)" in FIG. 8B. Therefore, the vector values of those are obtained as 8/12=⅔.

Similarly, it is possible to obtain the similarity based on the correlative relationship between the tenant 2 and the new tenant (Similarity_Corr(tenant2, new tenant)) by using, for example, the system configuration information of FIG. 8B.

Similarity Calculation on Adjusted-Cosine Base

Further, as still another example of the similarity calculation, it is possible to calculate the similarity on an Adjusted-Cosine base. In this case, for example, it is possible to calculate the similarity between "A" and "B" by using the following Definition Formula (6).

$$\text{Similality\_Adjusted\_Cos}(A, B) = \frac{\Sigma_i(A_i - \overline{A_c})(B_i - \overline{B_c})}{\sqrt{\Sigma_i(A_i - \overline{A_c})^2}\sqrt{\Sigma_i(B_i - \overline{B_c})^2}} \quad (6)$$

Where, the variable "i" in Definition Formula 6 corresponds to, for example, the number of predetermined items illustrated in FIG. 8B, and the variable "c" corresponds to the averaged evaluations relative to the items.

Therefore, when the similarity between the tenant 2 and the new tenant is calculated by using the above Formula 6, which is the similarity calculation formula on the adjusted-cosine base, a result as illustrated in the following Formula (7) is obtained.

$$\begin{aligned}
&\overline{A_{LB}} = \overline{B_{LB}} = 1, \overline{A_{AP1}} = \overline{B_{AP1}} = 1, \overline{A_{AP2}} = \overline{B_{AP2}} = \frac{5}{7}, \overline{A_{AP3}} = \overline{B_{AP3}} = \frac{2}{7}, \\
&\overline{A_{DB}} = \overline{B_{DB}} = 1, \overline{A_{CACHE}} = \overline{B_{CACHE}} = \frac{5}{7}, \overline{A_{AVG\_Small}} = \overline{B_{AVG\_Small}} = \frac{1}{7}, \\
&\overline{A_{AVG\_Middle}} = \overline{B_{AVG\_Middle}} = 1, \overline{A_{AVG\_Large}} = \overline{B_{AVG\_Large}} = \frac{1}{7}, \\
&\overline{A_{PATTERN\_Small}} = \overline{B_{PATTERN\_Small}} = 0, \overline{A_{PATTERN\_Middle}} = \overline{B_{PATTERN\_Middle}} = \frac{5}{7}, \\
&\overline{A_{PATTERN\_Large}} = \overline{B_{PATTERN\_Large}} = \frac{2}{7}, \\
&\text{Similality\_Adjusted\_Cos}(\text{Tenant 2, New tenant}) = \frac{-17}{\sqrt{75}\sqrt{86}}
\end{aligned} \quad (7)$$

For example, in the above Formula (7), a value "1" is set to the "LB" of all seven tenants including the tenants 1-6 and the new tenant. The vector value of the evaluation average of "$A_{LB}$" and "$A_{LB}$", therefore, is 7/7=1. Further, in "AP2" of the system configuration, a value "1" is set to the five tenants except tenant 4. The vector value of the evaluation average of "$A_{AP3}$" and "$A_{AP3}$", therefore, are 5/7. By doing this, the evaluation average vector of the predetermined items can be calculated.

The "AVE_Small (Middle, Large)" in Formula (7) indicates that the "access pattern (average number of requests)" of FIG. 8B is small (middle, large). Further, the "PATTERN_ Small (Middle, Large)" in Formula (7) indicates that the "access pattern (variance of the number of requests)" of FIG. 8B is of FIG. 8B is small (middle, large).

By doing this, it becomes possible to acquire the adjusted-cosine based similarity between the tenant 2 and the new tenant (i.e., "Similarity_Adjusted Cos (tenant 2, new tenant)".

Specific Example of Timing Evaluation

Next, in this embodiment, the timing ("Timing (t)") is evaluated when "Tenant2_Record1" was executed.

FIG. 11 illustrates the evaluation of the timings. FIG. 11 illustrates the handling history DB 12 of FIG. 10 and the system configuration of FIG. 8B. The timing is evaluated with respect to the above described information by using a predetermined scale. As the predetermined scale, for example, one month is set to "1" for calculation. Note that, however, the scaling is not limited to this scaling.

According to the data of the handling history DB 12 of FIG. 10 and the system configuration information of FIG. 8B, in the case of "Tenant2_Record1", it is ten months (i.e., t=10) from the starting date of the tenant 2 (system generation date and time "2010/") to the date when the handling was executed (2011/10/1).

Then, when the evaluation value of the timing is calculated using the Formula of FIG. 11 by setting "$t_0=14$" ($t_0$:the elapsed time from the release of the system to be evaluated (system generation data and time "2010/12/01") to the system generation date and time of the new system "2012/02/01") and "t=10" (t: timing of the handling), a result "Timing(t)=$(3/14)^2$" is obtained.

Specific Example of Handling Result

Next, in this embodiment, a handling result of "Tenant2_Record1" is acquired. When a value "1" or "0" is set depending on whether the result is effective or not, respectively, the value "1" is set to the handling result of "Tenant2_Record1" because the handling result of "Tenant2_Record1" is effective according to the handling history DB 12 of FIG. 10.

In this embodiment, the process, which is similar to the example of calculating the evaluation of the "Tenant2_Record1", is performed on the handling records (Record). Further, in this embodiment, the calculation (evaluation) of the usefulness for each of the handling records is performed by multiplying the similarity acquired on a handling record basis, the evaluation of the timing, and the value of the handling result. Further, in this embodiment, the evaluation results of the handling records are added to the handling methods (OP1, OP2, and OP3) to acquires the corresponding usefulness. As a result, the usefulness of the OP1, OP2, and OP3 is acquired as described in the following Formulas (8) through (10), respectively.

Usefulness of $OP1 =$ \hfill (8)

Evaluation of Tenant1_Record1 + Evalutaion of Tenant2_Record1 + Evaluation of Tenant3_Record1 + Evaluation of Tenant4_Record1 + Evaluation of Tenant5_Record1 =

$$\frac{5}{2\sqrt{10}} \cdot \frac{1}{2}(e^{-4} + e^{-12}) \cdot 0 + \frac{3}{4} \cdot \frac{1}{2}(e^{-3} + e^{-11}) \cdot 1 + \frac{1}{2} \cdot \frac{1}{2}(e^{-4} + e^{-8}) \cdot 1 +$$

$$\frac{6}{4\sqrt{3}} \cdot \frac{1}{2}(e^{-4} + e^{-6}) \cdot 0 + \frac{7}{8} \cdot \frac{1}{2}(e^{-4} + e^{-6}) \approx 0.034$$

Usefulness of $OP2 =$ \hfill (9)

Evaluation of Tenant1_Record2 + Evalutaion of Tenant2_Record2 + Evaluation of Tenant3_Record2 + Evaluation of Tenant4_Record2 =

$$\frac{5}{2\sqrt{10}} \cdot \frac{1}{2}(e^{-3} + e^{-13}) \cdot 1 + \frac{3}{4} \cdot \frac{1}{2}(e^{-2} + e^{-12}) \cdot 0 +$$

$$\frac{1}{2} \cdot \frac{1}{2}(e^{-4} + e^{-8}) \cdot 1 + \frac{6}{4\sqrt{3}} \cdot \frac{1}{2}(e^{-3} + e^{-7}) \cdot 1 \approx 0.056$$

Usefulness of $OP3 =$ \hfill (10)

Evaluation of Tenant1_Record3 = $\frac{5}{2\sqrt{10}} \cdot \frac{1}{2}(e^{-2} + e^{-14}) \cdot 1 \approx 0.053$ Next, in this embodiment, based on the usefulness of the handlings, the handling method is determined which is to be employed in the new system. In this embodiment, for example, an average value of the usefulness of the handling methods is set to a threshold value, and the handling method having the usefulness greater than or equal to the threshold value is determined as the handling method to be employed in the new system. The average value is calculated as illustrated in the following formula (11), and the result is 0.048.

$$\overline{OP} = \frac{\text{Usefulness of } OP1 + \text{Usefulness of } OP2 + \text{Usefulness of } OP3}{3} \approx 0.048 \quad (11)$$

Further, as illustrated in Formulas (8) through (10), the usefulness of the OP1 through OP3 is 0.034, 0.056, and 0.053, respectively.

Therefore, OP2 and OP3 are employed as the handling methods for the new system, so that the handling methods for the new system are generated based on the OP2 and OP3.

Further, as another example method to determine the handling method, an evaluation value acquired based on the execution history in the past and a statistical value indicating the number of times when the handling method was effectively used are acquired, an evaluation value which covers a handling area exceeding a certain handling area is set to a threshold value, and the handling method to be employed is determined by using the threshold value.

As described above, according to this embodiment, it becomes possible to generate an appropriate handling method for a system operation, etc., by generating candidates of the handling method for a new system by extracting an existing system having higher similarity based on the similarity between one or more existing systems and the new system and using the handling method with respect to the extracted existing system.

Further, according to this embodiment, it becomes possible to introduce effective handling into the handling method without excess and deficiency right after a release of the new system by evaluating the handling methods, which were executed in the existing system in the past, by using the usefulness, so that it becomes possible to generate an appropriate handling method. Further, by using the handling method generated according to this method, it becomes possible to perform effective operations.

Further, according to this embodiment, for example, it is possible to calculate the usefulness with respect to the operations based on the existing handling graph and determine the handling graph to be employed in accordance with the calculated usefulness. Therefore, in this embodiment, it becomes possible to generate the handling graph even when there are no handling records in the past in a case of the new system, etc., and perform quick handling in response to an event such as a failure. Further, the application of this embodiment is not limited to the Cloud system 14 as described above. For example, the embodiment may also be widely applied to a distributed processing system including one or more computers and one or more relay apparatuses.

All examples and conditional language recited herein are intended for pedagogical purposes to aid the reader in understanding the invention and the concepts contributed by the inventor(s) to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the spirit and scope of the invention.

What is claimed is:

1. A non-transitory recording medium storing a computer-readable handling-method generation program causing a computer to execute a process comprising:

extracting at least one existing system, which has a predetermined similarity with a new system which is newly generated or whose configuration has been changed, based on the similarity between a system configuration of at least one existing system and a system configuration of the new system; and generating candidates of event handling methods corresponding to the new system by using handling methods corresponding to a predetermined event which corresponds to the extracted existing system, wherein the generating includes calculating usefulness which represents an index indicating a likelihood of employment of the handling method corresponding to the existing system for the new system, determining the handling method to be employed for the new system based on the calculated usefulness, and generating a handling method, which corresponds to the new system, based on the determined handling method, wherein the calculating includes calculating the usefulness based on a similarity in the system configuration between the existing system and the new system, a timing when the handling method was executed in the existing system, and effectiveness information indicating whether the handling method was effective.

2. The non-transitory recording medium according to claim 1, wherein, in the calculating, the usefulness is calculated by using a predetermined estimation function.

3. The non-transitory recording medium according to claim 1, wherein, in the determining, the handling method to be employed for the new system is determined when the calculated usefulness of the handling method is greater than or equal to a predetermined threshold value, and wherein the predetermined threshold value is an average value of the calculated usefulness of all the handling methods.

4. The non-transitory recording medium according to claim 1, wherein, the at least one existing system includes a system which is realized by Cloud computing.

5. A handling-method generation method comprising:

extracting at least one existing system, which has a predetermined similarity with a new system which is newly generated or whose configuration has been changed, based on the similarity between a system configuration of at least one existing system and a system configuration of the new system; and generating candidates of event handling methods corresponding to the new system by using handling methods corresponding to a predetermined event which corresponds to the extracted existing system, wherein the generating includes calculating usefulness which represents an index indicating a likelihood of employment of the handling method corresponding to the existing system for the new system, determining the handling method to be employed for the new system based on the calculated usefulness, and generating a handling method, which corresponds to the new system, based on the determined handling method, wherein the calculating includes calculating the usefulness based on a similarity in the system configuration between the existing system and the new system, a timing when the handling method was executed in the existing system, and effectiveness information indicating whether the handling method was effective.

6. An information processing apparatus comprising:

a memory; and at least one processor coupled to the memory, the at least one processor configured to cause the following to be performed:

extracting at least one existing system, which has a predetermined similarity with a new system which is newly generated or whose configuration has been changed, based on the similarity between a system configuration of at least one existing system and a system configuration of the new system; and generating candidates of event handling methods corresponding to the new system by using handling methods corresponding to a predetermined event which corresponds to the extracted existing system, wherein the generating includes calculating usefulness which represents an index indicating a likelihood of employment of the handling method corresponding to the existing system for the new system, determining the handling method to be employed for the new system based on the calculated usefulness, and generating a handling method, which corresponds to the new system, based on the determined handling method, wherein the calculating includes calculating the usefulness based on a similarity in the system configuration between the existing system and the new system, a timing when the handling method was executed in the existing system, and effectiveness information indicating whether the handling method was effective.

* * * * *